Patented May 14, 1940

2,200,938

UNITED STATES PATENT OFFICE

2,200,938

DYESTUFFS OF THE TRIARYLMETHANE SERIES

Ernst Teupel, Schkopau, and Ottmar Wahl, Leverkusen-I. G.-Werk, Germany, assignors to General Aniline & Film Corporation, a corporation of Delaware No Drawing. Application January 25, 1938, Serial No. 186,817. In Germany November 22, 1934

1 Claim. (Cl. 260—392)

The present invention relates to new dyestuffs of the triarylmethane series, more particularly it relates to dyestuffs of the general formula:

wherein T stands for the radical of a dyestuff of the triarylmethane series containing at least one sulfonic acid group, the group

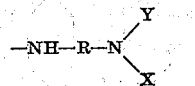

being attached to an aromatic nucleus in para-position to the carbinol C-atom, R stands for an arylene radical, X stands for a radical of the alkyl, aralkyl or aryl series, Y stands for a hydrogen atom or for a radical of the alkyl, aralkyl or aryl series, and the groups —NH and

stand in ortho- or para-position to each other.

Our new dyestuffs are obtainable by starting with such dyestuffs of the triarylmethane series as contain a replaceable atom or group in para-position to the carbinol C-atom, for instance a halogen atom, an alkoxy group, the sulfonic acid group or the nitro group, and reacting upon the same with an ortho- or para-arylenediamine of the general formula:

wherein R, X, and Y mean the same as stated above.

Our new dyestuffs are in form of their alkali metal salts generally dark, lustrous powders, dyeing the animal fiber generally greenish blue to reddish violet shades of good fastness to light and of good dischargeability.

This application is a continuation in part of our copending application Serial Number 50,472, filed November 18, 1935.

The invention is illustrated by the following examples, without being limited thereto, the parts being by weight:

Example 1

300 parts of the dyestuff of the following formula:

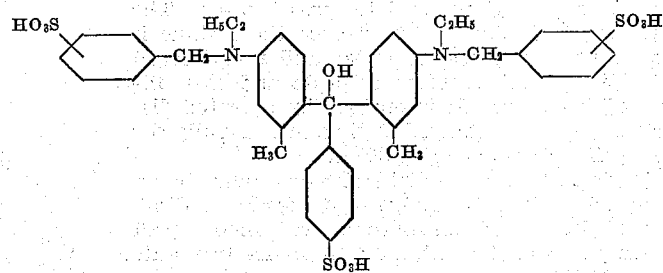

are heated at 100° C. with 400 parts of N-phenyl-ortho-phenylenediamine, until the green dyestuff has disappeared. The blue dyestuff which is obtained after separating the excess diamine and which corresponds in the carbinol form in the free state to the following formula:

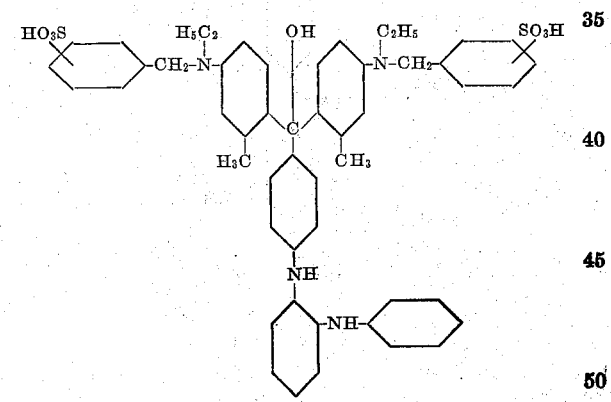

dyes wool and silk clear blue shades; the dyeings on silk can be discharged to a pure white.

A dyestuff of an improved solubility and of a better leveling power is obtained, when using instead of N-phenyl-ortho-phenylenediamine the corresponding quantity of 2-amino-diphenyl-amino-4'-sulfonic acid.

Dyestuffs possessing properties as those of the first mentioned dyestuff are obtained by reacting upon the same starting dyestuff with N,N-diethyl-para-phenyldiamine or N,N-dimethyl-para-phenylenediamine.

A dyestuff dyeing somewhat more reddish and clearer shades is obtained, when reacting upon the same starting dyestuff with N-benzyl-ortho-phenylenediamine.

Example 2

10 parts of the dyestuff of the following constitution:

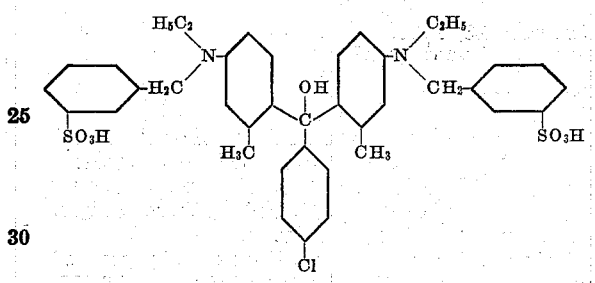

are heated for 36 hours to about 95 C. with 4.4 parts of para-aminomethylbenzylaniline-ortho-sulfonic acid of the formula:

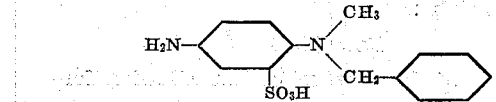

in 50 ccs. of pyridine and 10 ccs. of water. The pyridine is distilled off in vacuo; the residue is dissolved in 500 ccs. of water and the dyestuff precipitated with sodium chloride and then filtered by suction. It is purified by repeated dissolving in hot water and salting out. Finally the dyestuff is dried at about 90° C.

It yields on wool and silk greenish blue shades of good fastness to light. The dyeing on silk can be discharged to a pure white. The dyestuff corresponds in the carbinol form in the free state to the following formula:

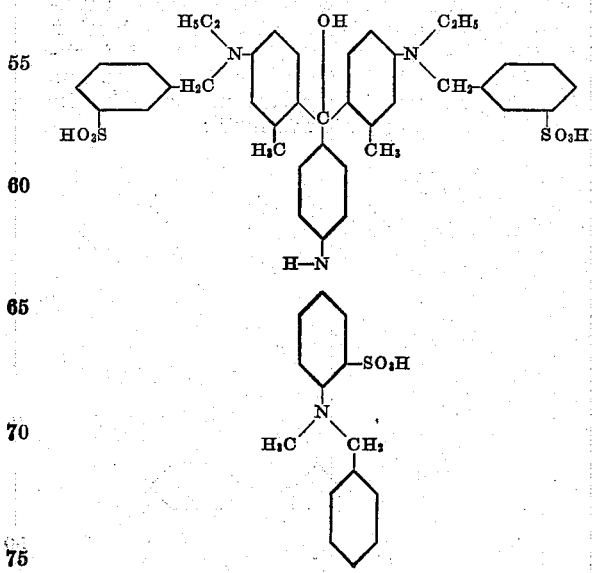

Example 3

10 parts of the dyestuff of the following formula:

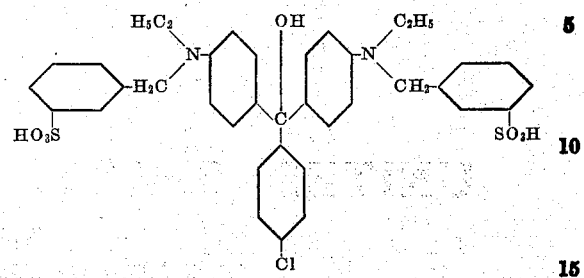

are heated for 24 hours to about 95° C. with 4.7 parts of para-aminodiethanolaniline-ortho-sulfonic acid of the constitution:

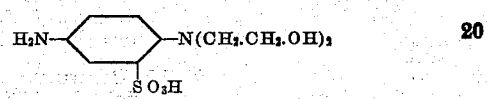

in 50 ccs. of pyridine and 5 ccs. of water. After the pyridine has been distilled in vacuo, the residue is dissolved in 500 ccs. of water and the dyestuff salted out with sodium chloride and filtered by suction. By repeated dissolving in hot water and salting out the dyestuff is purified and finally dried at 90° C. The dyestuff yields on wool and silk reddish blue shades; the dyeings on silk are well dischargeable.

The dyestuff corresponds in the carbinol form in the free state to the following formula:

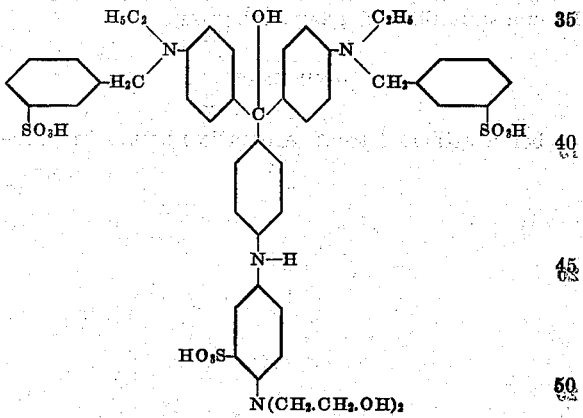

Example 4

15 parts of the dyestuff of the following constitution:

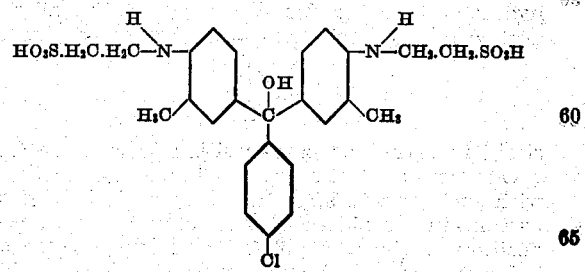

are heated for 24 hours to 95° C. with 6.4 parts of 4-amino-diphenylamine of the constitution:

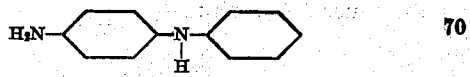

in 40 ccs. of pyridine and 40 ccs. of water. Then the mixture is diluted with 750 ccs. of water; the dyestuff is salted out by adding sodium chloride and filtered off. By repeated dissolving in hot water and salting out the dyestuff is purified and then dried at 90° C. The dyestuff yields on wool and silk reddish blue shades; the dyeings on silk are well dischargeable.

The dyestuff corresponds in the carbinol form in the free state to the following formula:

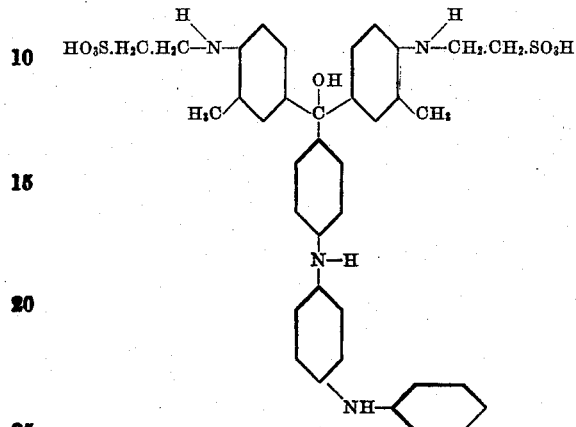

*Example 5*

15 parts of the dyestuff of the following constitution:

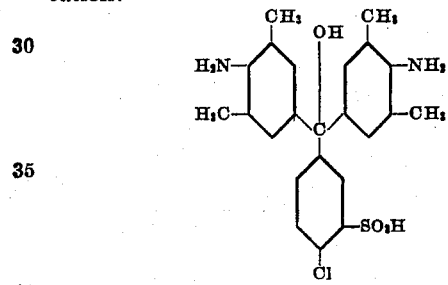

are heated for 12 hours to about 95° C. with 11 parts of 4'-methoxy-4-aminodiphenylamine sulfonic acid of the constitution

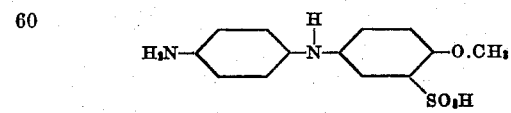

in 50 ccs. of pyridine and 50 ccs. of water. Then the mixture is diluted with 1 liter of water, sodium chloride is added to precipitate the dyestuff which is filtered off. The precipitate is boiled with 3 liters of water; the dyestuff is salted out, filtered off and dried at 90° C.

The dyestuff dyes wool and silk clear bluish violet shades which are very fast to light; the dyeings on silk are well dischargeable.

The dyestuff corresponds in the carbinol form in the free state to the following formula:

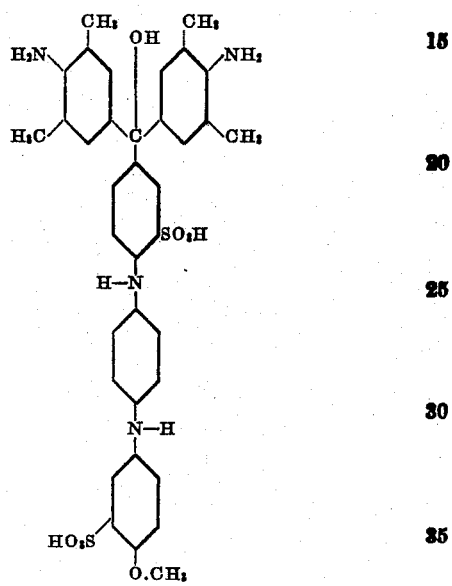

We claim:
The dyestuff corresponding in the carbinol form in the free state to the following formula:

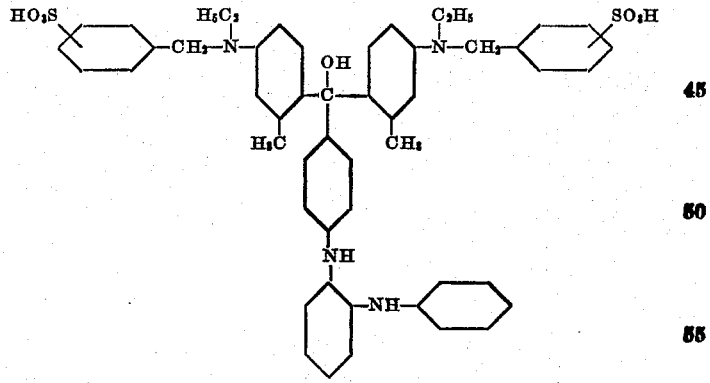

dyeing wool and silk clear blue shades, the dyeings on silk being dischargeable to a pure white.

ERNST TEUPEL.
OTTMAR WAHL.